US008532077B2

(12) United States Patent
Stacey et al.

(10) Patent No.: US 8,532,077 B2
(45) Date of Patent: Sep. 10, 2013

(54) FRAME FORMAT TECHNIQUES FOR NON-RESOLVABLE LONG TRAINING FIELDS IN WIRELESS NETWORKS

(75) Inventors: Robert J. Stacey, Portland, OR (US); Eldad Perahia, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 295 days.

(21) Appl. No.: 12/967,472

(22) Filed: Dec. 14, 2010

(65) Prior Publication Data

US 2012/0147866 A1   Jun. 14, 2012

(51) Int. Cl.
*H04W 84/02*   (2009.01)
(52) U.S. Cl.
USPC ......................................................... 370/338
(58) Field of Classification Search
USPC .................................. 370/338, 328; 375/260
See application file for complete search history.

(56) References Cited

U.S. PATENT DOCUMENTS

| 2010/0260159 | A1* | 10/2010 | Zhang et al. ................... 370/338 |
| 2010/0284393 | A1  | 11/2010 | Abraham et al. |
| 2011/0032875 | A1* | 2/2011  | Erceg et al. .................... 370/328 |
| 2011/0194544 | A1* | 8/2011  | Yang et al. ..................... 370/338 |
| 2011/0255620 | A1* | 10/2011 | Jones et al. .................... 375/260 |
| 2011/0305194 | A1* | 12/2011 | Zheng et al. ................... 370/328 |
| 2012/0033614 | A1* | 2/2012  | Sampath et al. ............... 370/328 |

FOREIGN PATENT DOCUMENTS

WO   2012/082306 A2   6/2012

OTHER PUBLICATIONS

International Search Report and Written Opinion Received for PCT Application No. PCT/US2011/061263, mailed on Jul. 2, 2012, 9 pages.

* cited by examiner

*Primary Examiner* — Asad Nawaz
*Assistant Examiner* — Parth Patel
(74) *Attorney, Agent, or Firm* — Ellis B. Ramirez; Prass LLP

(57) ABSTRACT

An embodiment of the present invention provides non-resolvable long training field (LTF) formatting methods used in wireless networks, comprising defining the non-resolvable LTF frame format so that a transmission of VHT-SIG-B is aligned for all users, thereby requiring that a VHT-LTF portion of a packet be of a same duration for all users.

9 Claims, 2 Drawing Sheets

FRAME FORMAT TECHNIQUES FOR NON-RESOLVABLE LONG TRAINING FIELDS IN WIRELESS NETWORKS

BACKGROUND

Downlink Multi-user, multiple-input-multiple-output (DL MU-MIMO) operation is being defined by the Institute for Electronic and Electrical Engineering (IEEE) in the 802.11ac standard. With DL MU-MIMO a transmission comprising multiple spatial streams may have different subsets of the streams directed to different users. Two transmit modes are possible: the first is referred to as resolvable LTFs; and the second referred to as non-resolvable LTFs. With resolvable LTFs (long training fields) each user sees training for all spatial streams, including the streams directed toward other users. With non-resolvable LTFs a particular user only sees training directed to that user and as a result the LTFs overlap in time.

Thus, a critical need is prevalent for frame format techniques for non-resolvable long training fields in wireless networks.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
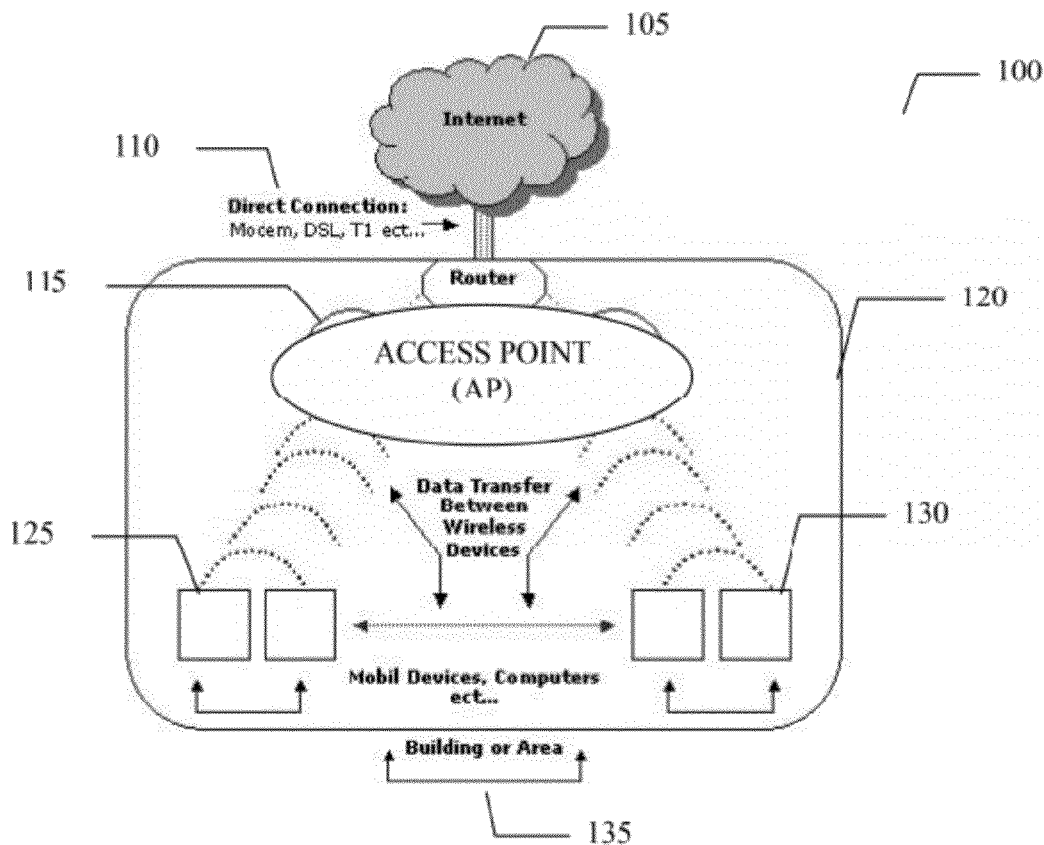
FIG. 1 depicts an exemplary system and apparatus according to embodiments of the present invention.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the preset invention may be practiced without these specific details. In other instances, well-known methods, procedures, components and circuits have not been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of stations" may include two or more stations.

Figure 2:
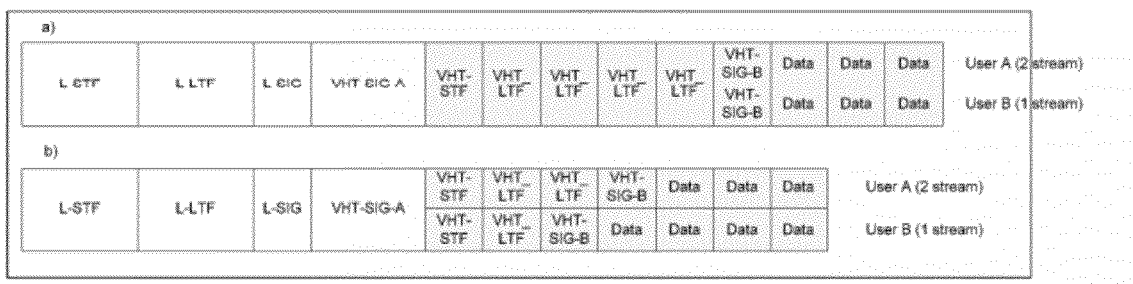
FIG. 2 illustrates example VHT formats with a) resolvable LTFs; and b) non-resolvable LTFs (long guard interval) according to embodiments of the present invention.

As articulated above, a Downlink Multi-user, multiple-input-multiple-output (DL MU-MIMO) operation is being defined by the IEEE 802.11ac standard. With DL MU-MIMO, a transmission comprising multiple spatial streams may have different subsets of the streams directed to different users. Two transmit modes are possible: the first is referred to as resolvable LTFs and the second referred to as non-resolvable LTFs. With resolvable LTFs, each user sees training for all spatial streams, including the streams directed toward other users. With non-resolvable LTFs a particular user only sees training directed to that user and as a result the LTFs overlap in time. The two options are illustrated in FIG. 2, generally shown as 200*a* and 200*b*.

Looking back now to FIG. 1 at 100 depicts an embodiment of the present invention which provides an apparatus and system, comprising a transceiver associated with a mobile device (125 or 130), which may be referred to as a wireless station (STA) operable to communicate in a wireless network that may be located in a specific area or building 135. The mobile devices may be in communication with access point 115 with an associated transceiver, which may be connected to the Internet 105 via, for example, a T-1 line or fiber optic line 110. The AP and STAs may be operating as part of the same basic service set (BSS) 120. The transceivers associated with the AP and STA may operate according to the techniques outlined above and according to the method described below.

Figure 3:
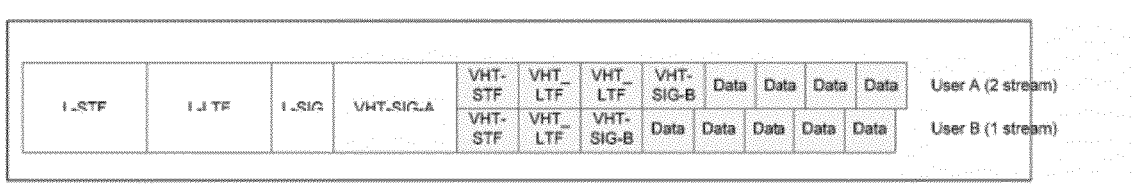
FIG. 3 illustrates an example VHT format with a different number of non-resolvable VHT-LTFs to each user according to embodiments of the present invention.

Because the non-resolvable LTFs overlap in time, an issue occurs when a different number of streams are sent to different users and short guard interval is used. For example, user A receives 2 streams while user B receives 1 stream as illustrated in FIG. 3, generally shown as 300. The training for user B would be shorter than the training for user A. As a result, VHT-SIG-B would follow after one LTF for user B, but after two LTFs for user A. With Short Guard Interval, the symbol timing is misaligned between the two users. This complicates the transmit architecture.

Figure 4:
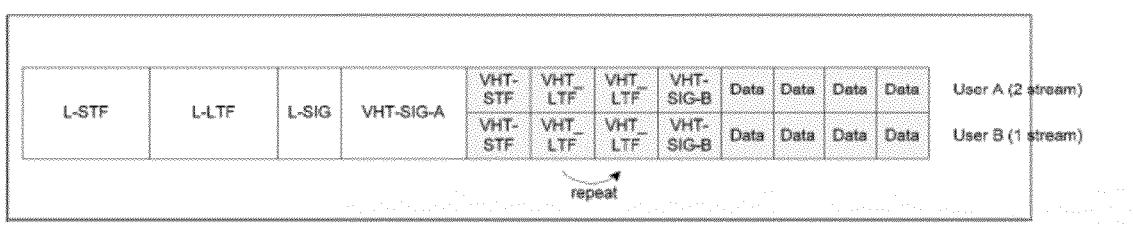
FIG. 4 illustrates an example VHT format with the same number of non-resolvable LTFs to each user according to embodiments of the present invention.

To simplify the architecture, embodiments of the present invention provide that the non-resolvable LTF frame format be defined so that the transmission of VHT-SIG-B is aligned for all users. This is illustrated in 400 of FIG. 4. This requires that the VHT-LTF portion of the packet be the same duration for all users. Embodiments of the present invention may further provide that this is achieved by transmitting the same number of VHT-LTFs to each user. Although not limited in this respect, one way of doing this is to chose the number required for the user with the most streams and transmit that number of VHT-LTFs to each user. For users that require a smaller number of VHT-LTFs, embodiments of the present invention provide that the VHT_LTFs are repeated to reach the needed number of VHT-LTFs.

No additional signaling is needed to support this and the number of space-time streams for each user is already available to all users in VHT-SIG-A. A user would simply chose the maximum value for all users to determine how many VHT-LTFs were present.

Elaborating on embodiments of the present invention provide a node operable in a wireless network and adapted to utilize non-resolvable long training field (LTF) formatting methods, comprising a transceiver capable of defining the non-resolvable LTF frame format so that a transmission of VHT-SIG-B is aligned for all users operating in the wireless network, thereby requiring that a VHT-LTF portion of a packet be of a same duration for all the users.

Embodiments of the present invention may further provide a computer readable medium encoded with computer executable instructions, which when accessed, cause a machine to perform operations comprising formatting non-resolvable long training field (LTF) used in wireless networks by defining the non-resolvable LTF frame format so that a transmission of VHT-SIG-B is aligned for all users, thereby requiring that a VHT-LTF portion of a packet be of a same duration for all users.

Embodiments of the present invention may further provide a system, comprising a wireless station (STA), and an access point (AP) adapted for communicating with the STA in a wireless network, wherein the AP is further adapted to utilize non-resolvable long training field (LTF) formatting methods, comprising defining the non-resolvable LTF frame format so that a transmission of VHT-SIG-B is aligned for all users operating in the wireless network, thereby requiring that a VHT-LTF portion of a packet be of a same duration for all the users.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

We claim:

1. Non-resolvable long training field (LTF) formatting methods used in wireless networks, comprising:
   if different number of streams are being sent to different users and short guard interval is used, then defining said non-resolvable LTF frame format so that a transmission of VHT-SIG-B is aligned for all users, thereby requiring that a VHT-LTF portion of a packet be of a same duration for all users;
   wherein requiring that a VHT-LTF portion of a packet be of a same duration for all users is achieved by transmitting a same number of VHT-LTFs to each user;
   wherein transmitting a same number of VHT-LTFs to each user is achieved by choosing the number required for a user with the most streams and transmitting said number of VHT-LTFs to each user;
   wherein for users that require a smaller number of VHT-LTFs, said VHT LTFs are repeated to reach a needed number of VHT-LTFs so that the VHT-LTF portion be of the same duration for all users.

2. The method of claim 1, wherein no additional signaling is needed as the number of space-time streams for each user is already available to all users in VHT-SIG-A and wherein a user chooses a maximum value for all users to determine how many VHT-LTFs were present.

3. A non-transitory computer readable medium encoded with computer executable instructions, which when accessed, cause a machine to perform operations comprising:
   if different number of streams are being sent to different users and short guard interval is used, then formatting non-resolvable long training field (LTF) used in wireless networks by defining said non-resolvable LTF frame format so that a transmission of VHT-SIG-B is aligned for all users, thereby requiring that a VHT-LTF portion of a packet be of a same duration for all users
   wherein requiring that a VHT-LTF portion of a packet be of a same duration for all users is achieved by transmitting a same number of VHT-LTFs to each user
   wherein transmitting a same number of VHT-LTFs to each user is achieved by choosing the number required for a user with the most streams and transmitting said number of VHT-LTFs to each user;
   wherein for users that require a smaller number of VHT-LTFs, said VHT LTFs are repeated to reach a needed number of VHT-LTFs.

4. The non-transitory computer readable medium encoded with computer executable instructions of claim 2, wherein no additional signaling is needed as the number of space-time streams for each user is already available to all users in VHT-SIG-A and wherein a user chooses a maximum value for all users to determine how many VHT-LTFs were present.

5. A node operable in a wireless network and adapted to utilize non-resolvable long training field (LTF) formatting methods, comprising:
   a transceiver capable of defining said non-resolvable LTF frame format so that a transmission of VHT-SIG-B is aligned for all users operating in said wireless network when different number of streams are being sent to different users and short guard interval is being used so that a VHT-LTF portion of a packet be is of a same duration for all said users;
   wherein requiring that a VHT-LTF portion of a packet be of a same duration for all users is achieved by transmitting a same number of VHT-LTFs to each user;
   wherein transmitting a same number of VHT-LTFs to each user is achieved by choosing the number required for a user with the most streams and transmitting said number of VHT-LTFs to each user;
   wherein for users that require a smaller number of VHT-LTFs, said VHT LTFs are repeated to reach a needed number of VHT-LTFs.

6. The node of claim 5, wherein no additional signaling is needed as the number of space-time streams for each user is already available to all users in VHT-SIG-A and wherein a user chooses a maximum value for all users to determine how many VHT-LTFs were present.

7. The node of claim 5, wherein said node is an access point (AP) of said wireless network.

8. A system, comprising:
   a wireless station (STA); and
   an access point (AP) adapted for communicating with said STA in a wireless network, wherein said AP is further adapted to utilize non-resolvable long training field (LTF) formatting methods when different number of streams utilizing short guard interval are being sent to different users, comprising defining said non-resolvable LTF frame format so that a transmission of VHT-SIG-B is aligned for all users operating in said wireless network, thereby requiring that a VHT-LTF portion of a packet be of a same duration for all said users;
   wherein requiring that a VHT-LTF portion of a packet be of a same duration for all users is achieved by transmitting a same number of VHT-LTFs to each user;
   wherein transmitting a same number of VHT-LTFs to each user is achieved by choosing the number required for a user with the most streams and transmitting said number of VHT-LTFs to each user;

wherein for users that require a smaller number of VHT-LTFs, said VHT LTFs are repeated to reach a needed number of VHT-LTFs.

9. The system of claim 8, wherein no additional signaling is needed as the number of space-time streams for each user is already available to all users in VHT-SIG-A and wherein a user chooses a maximum value for all users to determine how many VHT-LTFs were present.

\* \* \* \* \*